United States Patent Office 2,862,932
Patented Dec. 2, 1958

2,862,932

HETEROCYCLIC VAT DYESTUFFS

Wilhelm Schmidt-Nickels, Little York, N. J., assignor to General Aniline & Film Corporation, New York, N. Y., a corporation of Delaware No Drawing. Application December 30, 1955
Serial No. 556,474

12 Claims. (Cl. 260—346.2)

This invention relates to novel heterocyclic vat dyestuffs having the formula

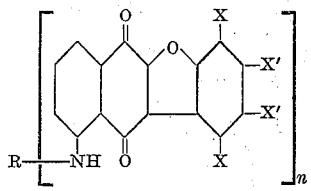

wherein one pair X—X' is hydrogen, the other pair X—X' is

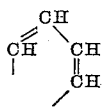

$n$ has a value of 2 or 3, and R is selected from the group consisting of phenyl, lower alkyl phenyl, lower alkoxy phenyl, diphenyl, lower alkyl diphenyl and lower alkoxy diphenyl.

These dyestuffs have good to excellent fastness properies with respect to washing, chlorine and light, in addition to yielding dyeings having improved brightness.

The provision of the above described dyestuffs, and methods for their production constitutes the objects and purposes of the instant invention.

The compounds of the instant invention may be prepared by reacting one mole of a compound of the formula $RBr_n$, wherein R and $n$ have the values given above with $n$ moles of a dyestuff intermediate of the formula

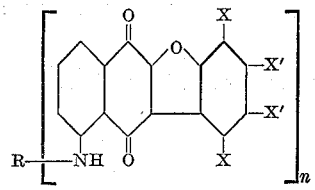

wherein each pair X—X' has the values given above (these dyestuff intermediatets, and methods for their production are disclosed and claimed in the copending application of Randall and Schmidt-Nickels, Serial No. 556,395 filed on even date herewith), in the presence of an alkaline acid binding agent and a copper catalyst.

The brominated phenyl and diphenyl compounds employed as reactants in the process of the instant invention may be produced in a manner well known in the art. As representative of such compounds there may be mentioned p-dibromobenzene, o-dibromobenzene, m-dibromobenzene, 1,3,5 - tribromobenzene, 1,2,4 - tribromobenzene, 4,4' - dibromodiphenyl, 3,3' - dibromodiphenyl, 2,2'-dibromodiphenyl, and their lower alkyl and lower oxyalkyl substituted derivatives. Such derivatives may contain 1,2 or more methyl, ethyl, isopropyl, methoxy, ethoxy, or propoxy groups or the like.

As stated above, the reaction is carried out in the presence of an alkaline acid binding agent, such as sodium carbonate, sodium acetate, potassium carbonate, potassium acetate, or the like, and a copper catalyst which may be copper in any form, copper oxide, cuprous chloride, cupric acetate, or the like, desirably in the presence of an inert organic diluent such as an aromatic hydrocarbon or halogenated aromatic hydrocarbon. As representative of such diluents, there may be mentioned nitrobenzene, chlorobenzene, dichlorobenzene, trichlorobenzene, naphthalene and the like.

The temperature at which this reaction may be carried out will be dependent upon the particular components present in the reaction mixture and the diluent employed. Generally, elevated temperatures are preferred, which for example may range from about 100 to 250° C. or more. The optimum temperature in any particular instance will be readily ascertainable by the worker skilled in the art.

The following examples, in which parts are by weight unless otherwise indicated, are illustrative of the instant invention and are not to be regarded as limitative. Unless otherwise indicated, parts by weight are in grams and parts by volume are in cc.

Example 1

A charge of 45 parts by volume nitrobenzene, 1.7 parts by weight para-dibromobenzene, 4.5 parts by weight of the dyestuff intermediate of the structure

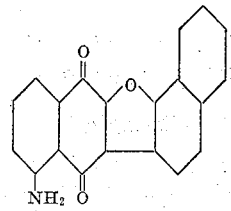

(prepared as described in Example 1 of said copending application) 2.8 parts by weight anhydrous potassium acetate and 1.4 parts by weight cuprous chloride was stirred at 200–205° C. for 20 hours.

The reaction product was filtered off at room temperature, washed with nitrobenzene, benzene, acetone, water and dried. It has the formula:

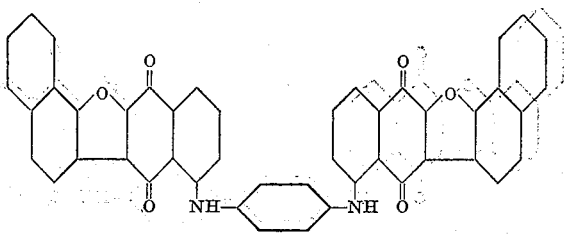

The product dyes cotton from an alkaline hydrosulfite vat strong gray shades of good fastness to washing, chlorine and light.

Example 2

A charge of 35 parts by volume nitrobenzene, 1.2 parts by weight para-dibromobenzene, 3.1 parts by weight of the dyestuff intermediate employed in Example 1, 1.1 parts by weight soda ash and 0.3 part by weight copper powder was reacted and worked up as described in Example 1.

The reaction product was identical with the product of Example 1.

Example 3

A charge of 35 parts by volume nitrobenzene, 1.7 parts by weight para-dibromobenzene, 4.5 parts by weight of the dyestuff intermediate of the structure:

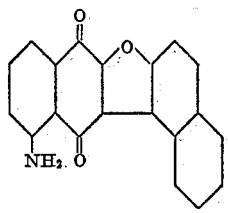

prepared as described in Example 2 of said copending application, 2.8 parts by weight anhydrous potassium acetate and 1.4 parts by weight cuprous chloride was reacted and worked up as described in Example 1.

The reaction product has the formula:

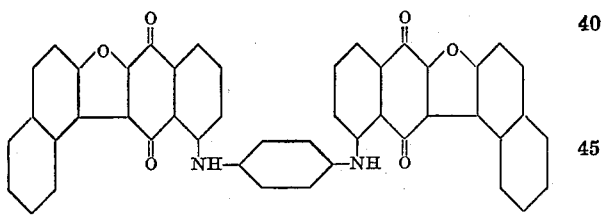

It dyes cotton from an alkaline hydrosulfite vat bluish tinted gray shades of good fastness to washing, chlorine and light.

Example 4

A charge of 45 parts by volume nitrobenzene, 2.2 parts by weight 4,4'-dibromodiphenyl, 4.5 parts by weight of the dyestuff intermediate employed in Example 1, 2.8 parts by weight anhydrous potassium acetate and 1.4 parts by weight cuprous chloride was reacted and worked up as described in Example 1. The reaction product has the formula:

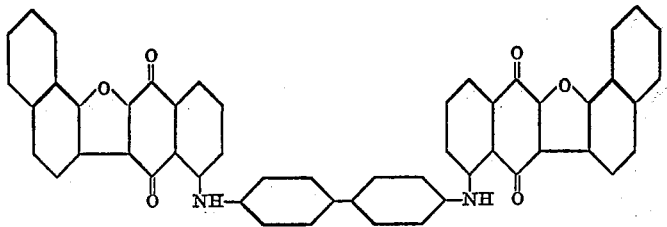

It dyes cotton from an alkaline hydrosulfite vat slightly bluish tinted gray shades of good fastness to washing, chlorine and light.

Example 5

A charge of 35 parts by volume nitrobenzene, 1.5 parts by weight 1,3,5 - tribromobenzene, 4.5 parts by weight of the dyestuff intermediate employed in Example 1, 2.8 parts by weight anhydrous potassium acetate and 1.4 parts by weight cuprous chloride was reacted and worked up as described in Example 1. The reaction product has the formula:

It dyes cotton from an alkaline hydrosulfite vat gray shades with a violet tint.

Example 6

A charge of 35 parts by volume nitrobenzene, 1.5 parts by weight 1,2,4-tribromobenzene, 4.5 parts by weight of the dyestuff intermediate employed in Example 1, 2.8 parts by weight anhydrous potassium acetate and 1.4 parts by weight cuprous chloride was reacted and worked up as described in Example 1.

The reaction product has the formula:

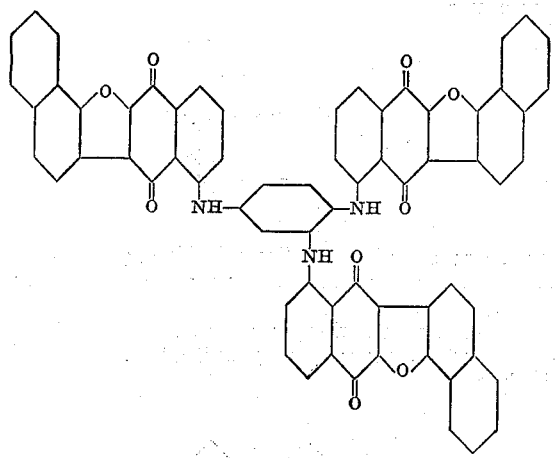

It dyes cotton from an alkaline hydrosulfite vat gray shades with a slightly brownish tint of good fastness to washing, chlorine and light.

*Example 7*

A charge of 45 parts by volume nitrobenzene, 1.8 parts by weight 2,5-dibromotoluene, 4.5 parts by weight of the dyestuff intermediate employed in Example 1, 2.8 parts by weight anhydrous potassium acetate and 1.4 parts by weight cuprous chloride was reacted and worked up as described in Example 1. The reaction product has the formula:

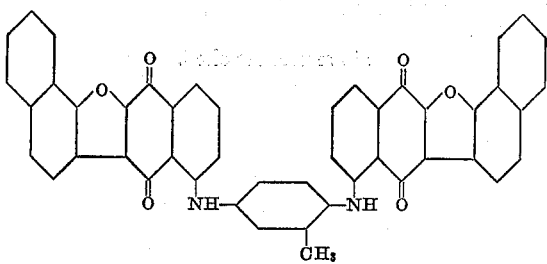

It dyes cotton from an alkaline hydrosulfite vat rather neutral gray shades of good fastness to washing, chlorine and light.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:

1. Compounds having the formula

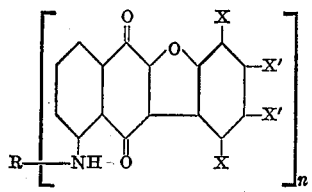

wherein one pair X—X' is hydrogen, the other pair X—X' is

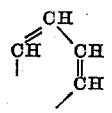

$n$ has a value of 2 or 3, and R is selected from the group consisting of phenyl, lower alkyl phenyl, lower alkoxy phenyl, diphenyl, lower alkyl diphenyl and lower alkoxy diphenyl.

2. A compound having the formula

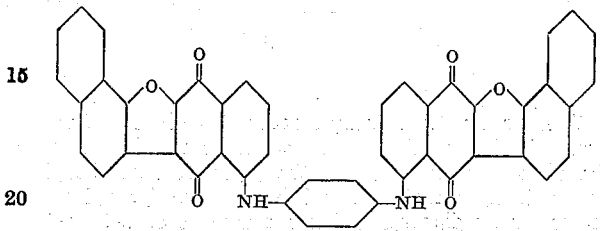

3. A compound having the formula

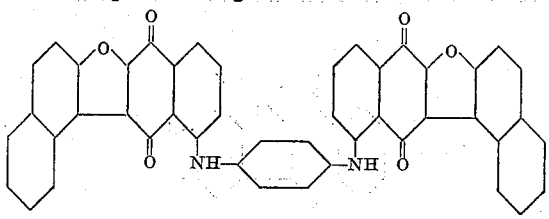

4. A compound having the formula

5. A compound having the formula

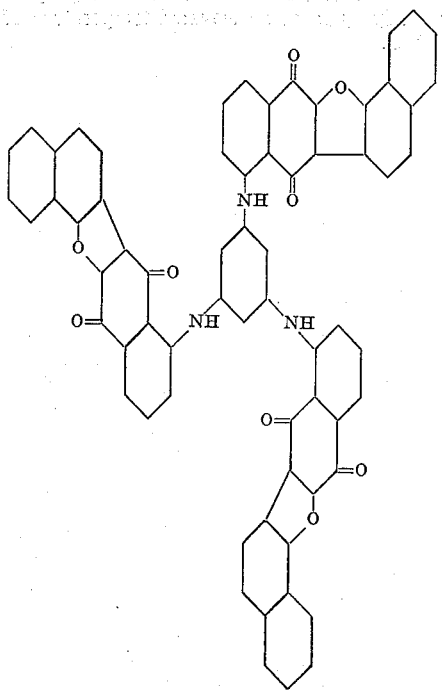

6. A compound having the formula

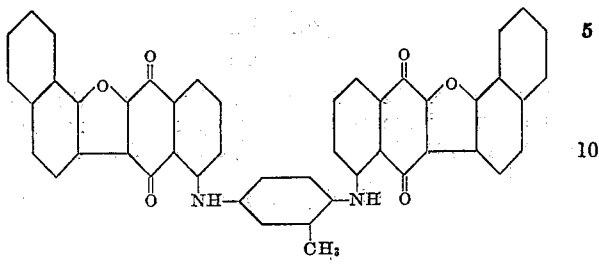

7. A process comprising reacting 1 mole of a compound having the formula RBr$_n$, wherein R is selected from the group consisting of phenyl, lower alkyl phenyl, lower alkoxy phenyl, diphenyl, lower alkyl diphenyl and lower alkoxy diphenyl and $n$ has a value of 2–3, with $n$ moles of a dyestuff intermediate of the formula

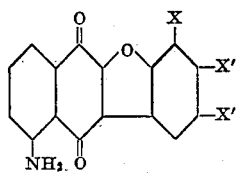

wherein one pair X—X' is hydrogen and the other pair X—X' is

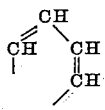

in the presence of an alkaline acid binding agent and a copper catalyst and at an elevated temperature of about 100–250° C.

8. A process comprising reacting 1 mole of p-dibromobenzene with 2 moles of a dyestuff intermediate having the formula

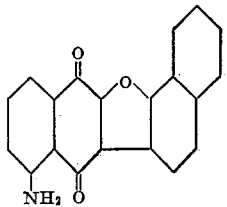

in the presence of an alkaline acid binding agent and a copper catalyst and at an elevated temperature of about 100–250° C.

9. A process comprising reacting 1 mole of p-dibromobenzene with 2 moles of a dyestuff intermediate having the formula

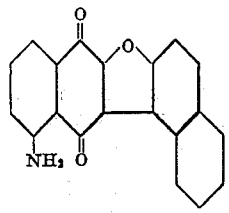

in the presence of an alkaline acid binding agent and a copper catalyst and at an elevated temperature of about 100–250° C.

10. A process comprising reacting 1 mole of 4,4'-dibromodiphenyl with 2 moles of a dyestuff intermediate as defined in claim 8, in the presence of an alkaline acid binding agent and a copper catalyst and at an elevated temperature of about 100–250° C.

11. A process comprising reacting 1 mole of 1,3,5-tribromobenzene with 3 moles of a dyestuff intermediate as defined in claim 8, in the presence of an alkaline acid binding agent and a copper catalyst and at an elevated temperature of about 100–250° C.

12. A process comprising reacting 1 mole of 2,5-dibromotoluene with 2 moles of a dyestuff intermediate as defined in claim 8 in the presence of an alkaline acid binding agent and a copper catalyst and at an elevated temperature of about 100–250° C.

No references cited.

UNITED STATES PATENT OFFICE
Certificate of Correction

Patent No. 2,862,932                                                                December 2, 1958

Wilhelm Schmidt-Nickels

It is hereby certified that error appears in the printed specification of the above numbered patent requiring correction and that the said Letters Patent should read as corrected below.

Column 1, lines 50 to 57, inclusive, the formula should appear as shown below instead of as in the patent:

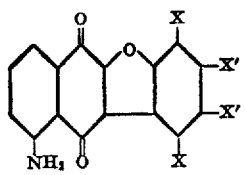

column 7, lines 26 to 32, inclusive, the formula should appear as shown below instead of as in the patent:

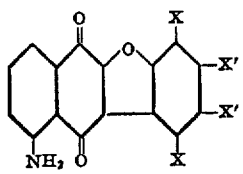

Signed and sealed this 5th day of July 1960.

[SEAL]

Attest:
KARL H. AXLINE,
*Attesting Officer.*

ROBERT C. WATSON,
*Commissioner of Patents.*